E. C. WALLACE.
PROCESS FOR PRODUCING WEARING SURFACES FOR STREETS AND ROADS.
APPLICATION FILED MAY 21, 1910.
1,183,507.   Patented May 16, 1916.
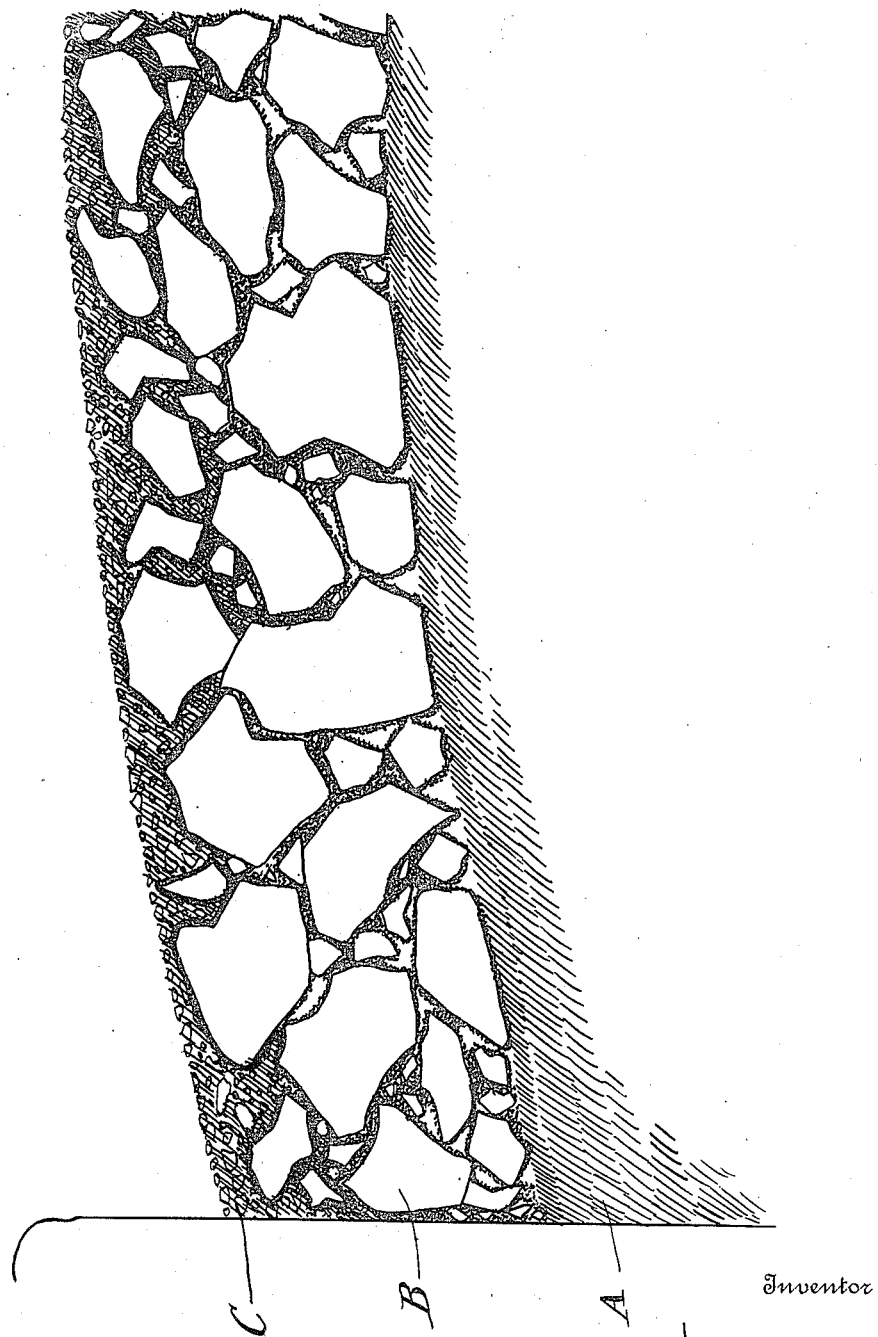

UNITED STATES PATENT OFFICE.

EDWIN C. WALLACE, OF EAST AUBURN, CALIFORNIA.

PROCESS FOR PRODUCING WEARING-SURFACES FOR STREETS AND ROADS.

1,183,507. Specification of Letters Patent. Patented May 16, 1916.

Application filed May 21, 1910. Serial No. 562,752.

*To all whom it may concern:*

Be it known that I, EDWIN C. WALLACE, a citizen of the United States, residing at East Auburn, in the county of Placer and State of California, have invented new and useful Improvements in Processes for Producing Wearing-Surfaces for Streets and Roads, of which the following is a specification.

The present invention relates to processes for producing wearing surfaces for streets and roads.

The object of my present application is to regulate the percentage of voids in the mineral matter used for the lower course of wearing surface, and also to permit the use of stone other than crusher run, as in many cases this may prove advantageous in reducing the cost of construction.

Generally speaking, the present process contemplates the laying of a composite wearing surface expeditiously at small cost of skilled direction, apparatus and material, whereby a composite surface is formed whose lower and upper courses will be intimately blended and bonded at the top of the lower course, the upper course being so laid and blended with the lower course as to form therewith one integral mass so that slipping or separation of the courses by the action of traffic or of the elements is rendered impossible all with the use of materials which are readily obtainable, the wearing surface produced being, as it were, integral, firm, not subject to ready erosion and capable of standing great wear.

The accompanying drawing illustrates a wearing surface made by the present process.

As an instance of my method of procedure in such cases the following will suffice. Broken stone passing screen 1½ inch gage and retained on screen of ½ inch gage is mixed with sufficient sand or earthy material to reduce the voids to 22%–28% of the mass. If deemed expedient, a small proportion of either or both hydraulic cement, or lime, slaked or unslaked, may be used. The stone and other materials are mixed with sufficient bituminous cementing medium to thoroughly coat all the particles. It is then disposed on the previously prepared foundation without compression as the lower course B.

The next step in the process is the laying on the lower course B of the upper course C which is, previous to laying, made up of a fine bituminous mixture, to wit, a mixture produced by commingling either sand or crusher screenings or both, with sufficient bituminous cementing medium to coat all particles and form an agglutinated mass. If considered desirable a small proportion of either or both hydraulic cement or lime slaked or unslaked may be added. As thus previously prepared this bituminous mixture is spread in thin coat C over the course B and thereupon constitutes the upper course.

The third and last step of the process is subjecting the courses B and C to an initial pressure by a heavy roller or other suitable means, and thereby simultaneously compressing the upper and lower courses to the desired extent. The action of the roller passing to and fro over the fine mixture, disposed on the uncompacted layer of relatively coarse mixture is to readily force this fine mixture into the interstices of the lower layer and at the same time to compress and compact the elements of that layer, and by so doing, bonding and blending the upper course C with the lower course B. The pressure, however, applied is the first pressure given to either of the courses and it results not only in a thorough compression of the respective courses, but also in an intimate blending and bonding of the respective courses, particularly in the upper part of the lower course B, thereby producing a composite surface which in structure and attributes is radically different from any multi-layer or stratified pavements because the courses B and C are, by the single compression referred to, made into one, substantially integral surface whose lower portion has the requisite durability, strength and rigidity, and whose upper portion or wearing surface is dense, impermeable and adapted to close or seal without tendency to ravel or separate.

I wish to call attention to the fact that no effort is made to fill the voids to repletion throughout the mass but to so regulate the voids in lower portions thereof that the resultant wearing surface while possessing sufficient rigidity in its lower portion to withstand traffic is less dense in the lower than in the upper portion of the mass.

The application of the top course C to lower course B before the latter is compacted is essential to my process as otherwise the blending of the two courses as above described cannot be accomplished.

I claim—

The herein described method of constructing the wearing surface of a pavement, which comprises (a) mixing together a relatively large volume of a coarse mineral aggregate composed of crushed stone of various sizes from 1½ inches down to ½ inch and a sufficient amount of finely crushed solid matter to regulate the voids in the mixture to within the limits of 22 to 28% by volume and with only a sufficient quantity of a bituminous cementing agent to coat all the pieces of said materials therewith without filling the voids therein, thereafter (b) placing the same upon a suitable foundation, in amount sufficient to form a relatively deep loose lower layer, (c) producing a relatively small amount of a second mixture consisting essentially of finely crushed solid matter, sized to pass a screen having six meshes per linear inch and a bituminous cementing agent, and (d) loosely spreading said second mixture upon said loose lower layer, without previous compression of said lower layer, thereby producing a plurality of superposed loose layers; and finally (e) simultaneously compressing both the upper and lower layers by rolling the upper layer whereby an intimate locking of the upper and lower layers is effected, and a single rigid layer, without joint or cleavage, and in which the lower portion consists largely of coarse mineral aggregate in which the interstices are not completely filled, and shading upward with a decrease in the amount of coarse particles, and an increase in the amount of fine particles, until the immediate upper surface of the layer consists substantially of fine mineral matter with bituminous cement, is produced.

In testimony whereof I have hereunto set my hand in presence of two subscribing witnesses.

EDWIN C. WALLACE.

Witnesses:
A. M. PARKINS,
WM. W. DEANE.